United States Patent Office 2,933,505

Patented Apr. 19, 1960

2,933,505

PREPARATION OF CHLORINE-CONTAINING COPPER PHTHALOCYANINES

Julius Jackson, Westfield, N.J., assignor to E. I. du Pont de Nemours and Company, Wilmington, Del., a corporation of Delaware No Drawing. Application February 5, 1957 Serial No. 638,224

9 Claims. (Cl. 260—314.5)

This invention relates to a process for the preparation of chlorine-containing copper phthalocyanine pigments which are crystal stable and highly resistant to flocculation in coating compositions.

Phthalocyanine pigments, and copper phthalocyanine in particular, are well known products which are described in many patents and other publications. There are two widely used methods of preparation. In the one method, a phthalic acid derivative, such as phthalic anhydride, is reacted with urea and a metal salt, such as copper chloride, usually in the presence of an inert diluent liquid at temperatures in the range of about 190° C.–220° C. In the other method, with which this invention is concerned, an aromatic dinitrile, such as phthalonitrile, is reacted with a metal salt, such as a copper chloride, at a temperature in the range of 180° C.–300° C. As in the first process, it is common to carry out this reaction in the presence of an inert diluent liquid although both processes may be carried out in the absence of diluent liquid. The diluent liquid may be removed by simple filtration, by steam distillation, or by simple decantation after the pigment has been treated to promote settling. This is usually followed by a conventional drying step.

After drying, pigments obtained by either of these processes are usually subjected to some form of particle size reduction to develop their full pigmentary properties. Various methods of achieving this end have been proposed and widely used. The oldest method is essentially a chemical process in that the pigment is reacted with concentrated sulfuric acid to form a sulfate which is then dissolved in additional concentrated sulfuric acid and reprecipitated by drowning the solution in a large volume of water. In contrast to this essentially chemical method of particle size reduction, there have been proposed a number of methods which are essentially mechanical in character in that the particle size reduction is brought about by various types of milling operations. The pigment may be charged to a ball mill together with a relatively large amount of a crystalline material, such as common salt, and after a suitable milling period with relatively large steel balls or similar milling aids, the pigment is isolated by extraction of the water-soluble salt and then purified, usually with dilute acid solution. In another process of like character, the pigment is milled in a ball mill in an organic liquid, such as acetone, preferably using small (±⅛" diameter) steel shot as the grinding aid. The acetone is removed by steam distillation and a similar purification by extraction with dilute acid is usually used.

There are two problems concerning the use of phthalocyanine pigments which have been widely recognized and which have received much attention in published art. The first of these is "crystal stability." Some phthalocyanine pigments have been found to grow relatively large crystals when exposed to certain organic solvents, such as aromatic hydrocarbons, which are often used in connection with the formulation of coating compositions. This crystal growth reverses the effect of the particle size reduction and results in a marked loss in the tinctorial powers of the pigment. It has also been found that phthalocyanine pigments are not only subject to crystal growth but that they are capable of existing in two crystal phases. One phase which has been arbitrarily designated the alpha phase in much published literature (see FIAT Report 1313 vol. 3, p. 447; also U.S. Patent 2,556,726) is relatively red in hue and quite prone to change to the beta crystal phase which is much greener in hue. By the selection of suitable conditions, it is possible to obtain the beta phase in a small particle size which is resistant to crystal growth and is therefore regarded as crystal stable. In order to obtain the redder shade (the alpha phase) of pigment in a crystal stable form, it has been common practice to introduce a small amount (from 3% to 6%) of chlorine into the pigment. Such partially chlorinated products may be obtained in the phthalic anhydride-urea synthesis by the use of a small amount of a chlorinated phthalic acid derivative in the synthesis. If the phthalonitrile synthesis is carried out with a copper chloride at temperatures above 180° C., chlorine is introduced into the copper phthalocyanine molecule. Thus, in the conventional operating range of 190° C.–220° C. for the phthalonitrile synthesis, the use of cuprous chloride has resulted in the introduction of about half of the theoretical amount of chlorine to be found in a monochloro copper phthalocyanine, whereas the use of cupric chloride in the synthesis has resulted in the formation of a monochloro copper phthalocyanine.

In addition to the problem of crystal stability for which solutions are shown above, phthalocyanine pigments can present a second problem which is known as "flocculation." This problem becomes apparent when a coating composition containing a flocculating phthalocyanine pigment is applied by different methods, and it manifests itself as variations in color which seem to depend upon the degree to which work is done on the coating composition during its application to a surface or during the drying of the film. Thus, a paint film which is applied by dipping or pouring is frequently much lighter in color than the same paint film applied by spraying. This situation is encountered in the manufacture of automobiles wherein certain items, such as fenders, may be coated by dipping, whereas the rest of the body is coated by spraying. Another difficulty due to flocculation arises when paints are applied by brushing since lapped areas where the partially set film is rebrushed frequently show up darker than the rest of the surface. Pigments which have been stabilized against crystal growth by the introduction of chlorine into the molecule seem to be especially subject to this phenomenon of "flocculation," and this invention is designed to overcome the flocculation tendency of such chlorine-containing copper phthalocyanine pigments.

It is the object of this invention to prepare a chlorine-containing, flocculation-resistant copper phthalocyanine pigment exhibiting the tinctorial characteristics of the alpha crystal phase.

The objects of this invention are accomplished by synthesizing copper phthalocyanine coloring matters from an o-arylene dinitrile and a copper chloride in the presence of from .015 to .15 mol of an aromatic tertiary nitrogen base such as pyridine per mol of the o-arylene dinitrile. The copper phthalocyanine so prepared is then reduced to pigment particle size by mechanical means to produce a flocculation-resistant, crystal-stable, chlorine-containing copper phthalocyanine predominantly in the alpha crystal phase. The unusual pigment obtained is a result of using the amount of nitrogen base (such as pyridine) specified above in conjunction with a particle size reduction by mechanical means. Chemical means for reducing particle size destroy the flocculation resistance.

In a preferred embodiment, the invention is carried out by heating phthalonitrile and a copper chloride at a temperature above 180° C. but below the temperature at which the phthalonitrile will carbonize in the presence of from .015 to .15 mol of pyridine per mol of phthalonitrile. The heating is continued until a blue solid coloring matter is obtained. This material is then recovered and reduced to pigment particle size by a milling operation, preferably in a ball mill. After the milling operation, and purification of the pigment by conventional extraction in dilute acid solution, there is obtained a flocculation-resistant, crystal-stable, chlorine-containing phthalocyanine pigment.

In another preferred embodiment of the invention, phthalonitrile and a mixture of cuprous chloride and cupric chloride are reacted in kerosene as an inert diluent and in the presence of about .025 mol of pyridine per mol of phthalonitrile together with a small amount of ammonium molybdate at a temperature of about 200° C. The pigment is preferably isolated from the kerosene by adding concentrated sulfuric acid, decanting off the kerosene, hydrolyzing the phthalocyanine sulfate and neutralizing with an alkali after which the pigment is filtered from the liquid and dried. The crude pigment is then ground in a ball mill with acetone using steel shot as the grinding aid after the manner of U.S. Patent 2,556,727. Grinding is followed by removal of the acetone, extraction in dilute acid, filtering, washing and drying. The resulting product is a chlorine-containing phthalocyanine which is crystal stable and highly resistant to flocculation.

In another embodiment of this invention, the copper chloride and the pyridine may be premixed and reacted before being commingled and heated with the phthalonitrile in the main synthesis reaction. This procedure is exemplified in detail by Example VI which follows.

The following examples illustrate this invention in its various manifestations in detail. Unless otherwise stated, all parts are given in terms of parts by weight.

*Example I*

The following ingredients are charged to a well-agitated reactor equipped with an air-cooled reflux condenser and arranged for external heating:

128 parts phthalonitrile (1 mol)
7.1 parts cupric chloride anhydrous (0.053 mol)
20.8 parts cuprous chloride anhydrous (0.21 mol)
0.7 part ammonium molybdate
2.0 parts pyridine (0.025 mol)
310 parts deodorized kerosene The mixture is heated with good agitation to about 205° C. over a period of about 30 minutes and held at 205° C.–210° C. for about 4 hours. It is then cooled to about 150° C. and 310 parts of 98% $H_2SO_4$ is added slowly. The mixture is stirred for a short time and then the agitator is stopped, whereupon the kerosene floats to the surface and is decanted. The solid remaining is added to a mixture of 1000 parts of water and 1000 parts of ice to which about 270 parts of sodium hydroxide is then added to make the slurry alkaline. The alkaline slurry thus obtained is heated to the boil and boiled for 1½ hours. It is filtered, washed free of soluble salts and dried at 120° C. for about 16 hours until free of kerosene. About 142 parts of a crude copper phthalocyanine containing about 2.4% chlorine is obtained.

This crude product is conditioned for use by the milling method of U.S. Patent 2,556,727 to Lane and Stratton. 65 parts of the crude pigment and 400 parts of acetone are charged, together with 4800 parts of ⅛" steel shot, to a ball mill of such size that it is slightly more than ½ full when all ingredients are in. This mill is then rotated at about 70% of critical speed for about 48 hours. The slurry is discharged from the mill; the acetone is removed by steam distillation; and the resulting aqueous slurry is extracted with hot dilute (4–5%) sulfuric acid. It is then filtered, washed free of soluble salts, dried and pulverized to give a blue copper phthalocyanine pigment predominately in the alpha phase which is crystal stable and highly resistant to flocculation when dispersed in a coating composition vehicle.

*Example II*

The synthesis process of Example I is repeated except that 630 parts of trichlorobenzene is used instead of the deodorized kerosene. Since trichlorobenzene has a high density, the separation of the liquids after the addition of the sulfuric acid is less efficient; hence, in this case, it is preferred to hydrolyze the sulfate with water and neutralize with sodium hydroxide and to then remove the trichlorobenzene by steam distillation. The crude product has substantially the same properties as the product of Example I except that the chlorine content is between 3.0% and 3.5%. After particle size reduction by milling in acetone, the product is an intense blue copper phthalocyanine pigment of which over 90% is in the alpha crystal phase, and this pigment exhibits the typical reddish blue shade of the alpha phase products. It is crystal stable when exposed to organic solvents, and it is highly resistant to flocculation in coating compositions. As an alternative method for particle size reduction, 10 parts of this crude pigment and 90 parts of sodium chloride are charged to a ball mill containing 1600 parts of steel bars ½" in diameter by 1" long and of such a size that it is slightly more than half full when charged. The mixture is milled for about 36 hours, discharged from the mill and extracted at the boil with about 650 parts of dilute (4–5%) sulfuric acid. After filtering, washing free of soluble salts, drying and pulverizing, an intense blue copper phthalocyanine pigment is obtained which is crystal stable and flocculation resistant.

*Example III*

The following ingredients are charged to the reactor of Example I:

128 parts phthalonitrile
35 parts cupric chloride anhydrous
0.7 part ammonium molybdate
6.0 parts pyridine
310 parts deodorized kerosene The mixture is heated with good agitation to about 205° C. over a period of about 1 hour and held at 205° C.–210° C. for about 4 hours. It is then cooled to about 150° C. and added to about 2000 parts of water containing about 20 parts of sodium hydroxide to give a pH of about 10.0. This emulsion-like mixture is heated to the boil under good agitation and then filtered and washed with hot water. The wet solid, which still contains some kerosene, is dried at 120° C.–130° C. until free of kerosene.

For particle size reduction, 60 parts of the crude pigment is charged to a ball mill filled to about 40% of its volume with about 1000 parts of iron bars (½" x 1"), milled for about 6 hours and discharged in dry form. 30 parts of this dry, partially milled product is then charged to a ball mill of the same size containing 1000 parts of ⅛" steel shot together with 140 parts of acetone and milled for about 12 hours. The slurry of pigment in acetone is discharged from the mill, the acetone is recovered by steam distillation and the pigment is extracted with 5% sulfuric acid. After filtration, washing, drying, and pulverizing, there is obtained a crystal-stable, flocculation-resistant, copper phthalocyanine pigment which contains about 4% chlorine and is substantially all in the alpha crystal phase.

Example IV

The process of Example I is repeated except that 26 parts of cuprous chloride anhydrous is used as the sole source of copper. The product after acetone milling contains about 1.8% chlorine and comprises a mixture of about 20% beta phase and 80% alpha phase copper phthalocyanine. Nevertheless, it exhibits the overall color properties of an alpha phase pigment; it is crystal stable and resistant to flocculation in coating compositions.

Example V (a) The procedure of Example I is followed except that 3.5 parts of quinoline is used in place of pyridine;

(b) The procedure of Example I is followed except that 3.5 parts of isoquinoline is used in place of pyridine;

(c) The procedure of Example I is followed except that 2.5 parts of picoline is used in place of pyridine.

The resulting products from the above processes exhibit markedly improved flocculation resistance in comparison to products made by an otherwise similar process in the absence of the aromatic tertiary nitrogen bases.

Example VI 35 parts of cupric chloride anhydrous and 5 parts of pyridine are mixed in the absence of water. A vigorous reaction takes place whereby a solid copper pyridinium complex is formed which is pulverized and mixed with 128 parts of phthalonitrile and 128 parts of crystalline sodium chloride. This dry mixture is heated in an inert vessel within an oven to about 200° C. whereupon a vigorous exothermic reaction takes place with the formation of a mixture of a chlorine-containing copper phthalocyanine and sodium chloride in approximately equal amounts.

For particle size reduction 116 parts of the crude pigment is charged to a ball mill filled to about 40% of its volume with about 1000 parts of iron bars (½" x 1"), milled for about 6 hours and discharged in dry form. 53 parts of this dry, partially milled product is then charged to a ball mill of the same size containing 1000 parts of ⅛" steel shot together with 140 parts of acetone and milled for about 12 hours. The slurry of pigment in acetone is discharged from the mill, the acetone is recovered by steam distillation and the pigment is extracted with 5% sulfuric acid. After filtration, washing, drying and pulverizing, there is obtained a crystal-stable, flocculation-resistant, chlorine-containing copper phthalocyanine of the alpha crystal phase.

This example is illustrative of the alternative embodiment which prereacts the pyridine and the copper chloride. The other aromatic nitrogen bases suitable in this invention may be prereacted in the same manner.

Example I is a preferred process which uses kerosene as the inert liquid diluent for the reaction. Example II shows trichlorobenzene as the liquid diluent, and Example VI uses no solvent at all but carries out the reaction in the fused state. The presence or absence of the solvent and the nature of the solvent appear to exert some influence on the chlorine content of the product resulting from the reaction as described, and this point seems to be reflected to some extent in the degree of flocculation resistance imparted by the process. However, a substantial improvement in flocculation resistance exists regardless of the nature of the solvent, and it is not contemplated that the nature of the solvent or its presence is at all critical to the improvement resulting from this invention.

All of the examples have shown the use of unsubstituted phthalonitrile in the preparation of the pigment for the simple reason that copper phthalocyanine is the only metal phthalocyanine which has achieved wide-scale commercial use as a pigment. Nevertheless, substituted phthalonitriles such as 4-chlorophthalonitrile, 4-nitrophthalonitrile, tetrachlorophthalonitrile, 2,3-naphthodinitrile may be used in this reaction, and where they are used, improvements in flocculation resistance will result from the use of a small amount of pyridine in the synthesis, provided the subsequent particle size reduction is accomplished by mechanical means.

The examples have shown syntheses prepared from cuprous chloride and from cupric chloride and from mixtures of these two ingredients. Since it is desired to obtain a chlorine-containing pigment, other copper salts are not contemplated as within the scope of this invention. The choice between the two copper salts or the mixtures thereof will be determined largely by the desired chlorine content which should be kept between about 1.8% and 5% by weight. In every case, however, the chlorine content of pigments synthesized in the presence of the pyridine is significantly less than would be expected if the pyridine were not present. It is a very surprising part of this invention that, in spite of this markedly lower chlorine content, the products possess the crystal stability of the previously known crystal-stable alpha phase copper phthalocyanines of significantly higher chlorine content. In the lower amounts of this 1.8–5% range for chlorine, the milling operations which use solvents frequently result in the conversion of a small amount, and in some cases up to 20%, of the pigment to the beta crystal phase. However, it is a surprising fact that the tinctorial properties do not reflect this presence of upwards of 20% of beta phase. Products made by this invention all show the relatively high strength and the relatively red hue characteristic of the alpha phase copper phthalocyanine pigments.

Example V shows several aromatic tertiary nitrogen bases which are effective for the purposes of this invention. However, pyridine is the preferred nitrogen base since it produces the most outstanding products. The amount of nitrogen base used is a critical feature of this invention. A range of .015 mol to .15 mol of nitrogen base per mol of phthalonitrile, which in the case of pyridine corresponds to approximately 0.9 part by weight to 9.0 parts by weight per 100 parts of phthalonitrile, has been found to produce flocculation-resistant, crystal-stable products. If amounts below this range are used, there is no significant improvement over products which are produced in the absence of the nitrogen base. Above the upper limit, flocculation resistance is not substantially affected, but tinctorial properties suffer markedly and crystal stability is lessened as a result of a significantly lower chlorine content. A preferred range of nitrogen base per mol of phthalonitrile is .025 to .075. The conditions for the phthalocyanine synthesis in the presence of the nitrogen base are substantially the same as they are for the well known processes of reacting an o-arylene dinitrile, such as phthalonitrile, with a copper chloride. Such processes are disclosed in U.S. Patents 2,129,013 and 2,242,301, and the conditions comprise heating an o-arylene dinitrile and a copper chloride at a temperature above 180° C. but below the temperature at which the dinitrile will carbonize until a solid blue coloring matter is obtained. The temperature range is usually above about 180° C. and up to about 300° C., and a range of about 190° C.–210° C. is preferred. In those syntheses which are carried out in a liquid diluent, temperatures up to 250° C. may be used. The time of reaction is usually at least 1 hour and preferably in the range of 2 to 4 hours. The usual reacting proportions are 4 mols of o-arylene dinitrile to about 1 mol of copper chloride.

The manner of recovering the pigment from the reaction mixture is not critical to this invention, but the best results are obtained by following the procedure of Example I. The preferred separation process as disclosed in this example involves the reaction of the pigment in the presence of the liquid diluent with a concentrated sulfuric acid to form the sulfate which readily settles from the reaction slurry and makes it possible to decant most of the kerosene from the reaction mixture. The sulfate is then hydrolyzed by immersing it in an aqueous alkaline solution, and finally, the pigment is extracted with an alkaline solution and filtered, washed and dried. The sulfation process is that shown in U.S. Patent 2,602,800 to Barnhart. The alternative process of simply adding alkali to the reaction mixture, filtering the emulsion-like mass, and then drying is also useful. However, the sulfation method insures the conversion of the pigment to the alpha phase prior to particle size reduction and is therefore preferred. The simple filtration process probably leaves some of the pigment in the beta phase, because of the influence of the solvent, and the conversion to alpha phase must be accomplished subsequently in the milling operation. This is, of course, easily done by simple salt milling. When trichlorobenzene is used as the solvent, steam distillation is used to subsequently remove it, since the high density of the liquid renders the decantation process difficult. These variations are all within the knowledge of the art and should be looked upon as alternative and conventional.

With respect to the particle size reduction process, it is pointed out that the well known acid pasting process is not effective since, for some unknown reason, it appears to destroy the flocculation resistance inherent in the crudes which are made by this process. Consequently, it has been necessary, and this is a critical feature of the invention, to carry out the particle size reduction by mechanical milling methods. Three alternatives are shown, but any of the mechanical methods for reducing pigment to desired particle size is suitable. Pigment particle size for copper phthalocyanine pigments is usually regarded by the art as being less than 0.2 micron and preferably between 0.01 and 0.1 micron. The preferred method as used in Example I is the acetone milling process of U.S. Patent 2,556,727, in which the pigment and acetone are ground in a ball mill with steel shot of approximately ⅛" diameter. The details of this process are not at all critical and are quite clear to those who may be familiar with ball milling operations.

Salt milling after the manner of U.S. Patent 2,402,167 is also useful as a finishing method. The pigment is ground in a ball mill using large balls or short bars as the grinding aid in the presence of several times its own weight of a water-soluble inorganic salt, such as sodium chloride. Again the details are not critical, and the process is well understood by those familiar with this field.

It is pointed out that some of the examples use a small amount of ammonium molybdate in the preparation. This material has been widely used as a catalyst in the phthalic anhydride urea synthesis, but its use in the phthalonitrile synthesis is not well known. This material is not necessary for the accomplishment of the principal objects of this invention, but it does significantly improve the yields.

Since it is obvious that many changes and modifications can be made in the above-described details without departing from the nature and spirit of the invention, it is to be understood that the invention is not to be limited to said details except as set forth in the appended claims.

I claim as my invention:

1. In a process for the production of chlorine-containing copper phthalocyanine coloring matters by heating an o-arylene dinitrile and a copper chloride at a temperature above 180° C. but below the temperature at which the dinitrile will carbonize until a blue solid coloring matter is obtained, the improvement which comprises conducting said heating in the presence of from .015 to .15 mol of an aromatic tertiary nitrogen base per mol of o-arylene dinitrile until the blue solid coloring matter is obtained, recovering said coloring matter and reducing it to pigment particle size by mechanical means and recovering a flocculation-resistant, crystal-stable, chlorine-containing copper phthalocyanine pigment exhibiting the characteristics of the alpha crystal phase.

2. In a process for the production of chlorine-containing copper phthalocyanine coloring matters by heating phthalonitrile and a copper chloride at a temperature above 180° C. but below the temperature at which phthalonitrile will carbonize until a blue solid coloring matter is obtained, the improvement which comprises conducting said heating in the presence of from .015 to .15 mol of an aromatic tertiary nitrogen base per mol of phthalonitrile until the blue solid coloring matter is obtained, recovering said coloring matter and reducing it to pigment particle size by mechanical means and recovering a flocculation-resistant, crystal-stable, chlorine-containing copper phthalocyanine pigment exhibiting the characteristics of the alpha crystal phase.

3. In a process for the production of chlorine-containing copper phthalocyanine coloring matters by heating phthalonitrile and a copper chloride until a blue solid coloring matter is obtained, the improvement which comprises conducting said heating at a temperature in the range of 180° C.–250° C. in the presence of from .015 to .15 mol per mol of phthalonitrile of an aromatic tertiary nitrogen base selected from the group consisting of pyridine, picoline, quinoline and isoquinoline until the blue solid coloring matter is obtained, recovering said coloring matter and reducing it to pigment particle size by mechanical means and recovering a flocculation-resistant, crystal-stable, chlorine-containing copper phthalocyanine pigment exhibiting the characteristics of the alpha crystal phase.

4. In a process for the production of chlorine-containing copper phthalocyanine coloring matters by heating phthalonitrile and a copper chloride in the presence of a liquid diluent until a blue solid coloring matter is obtained, the improvement which comprises conducting said heating at a temperature in the range of 180° C.–250° C. in the presence of from .015 to .15 mol per mol of phthalonitrile of an aromatic tertiary nitrogen base selected from the group consisting of pyridine, picoline, quinoline and isoquinoline until the blue solid coloring matter is obtained, recovering said coloring matter and reducing it to pigment particle size by mechanical means and recovering a flocculation-resistant, crystal-stable, chlorine-containing copper phthalocyanine pigment exhibiting the characteristics of the alpha crystal phase.

5. The process of claim 4 in which the heating is carried out in the presence of from .025 to .075 mol of pyridine.

6. In a process for the production of chlorine-containing copper phthalocyanine coloring matters by heating phthalonitrile, ammonium molybdate, and a copper chloride in the presence of a liquid diluent until a blue solid coloring matter is obtained, the improvement which comprises conducting said heating at a temperature in the range of 190° C.–210° C. in the presence of from .025 to .075 mol of pyridine per mol of phthalonitrile until the blue solid coloring matter is obtained, reacting said coloring matter with sulfuric acid to produce a sulfation product, removing said liquid diluent, hydrolyzing said sulfation product in an aqueous alkaline solution of sufficient alkalinity to neutralize the mixture, washing and drying the chlorine-containing copper phthalocyanine resulting from the aqueous treatment, ball milling the copper phthalocyanine thus obtained in the presence of acetone to pigment particle size and recovering a flocculation-resistant, crystal-stable, chlorine-containing copper phthalocyanine exhibiting the tinctorial characteristics of the alpha crystal phase.

7. A process for the production of flocculation-resistant, crystal-stable, chlorine-containing copper phthalocyanine pigment which comprises commingling phthalonitrile, a copper chloride and pyridine in the proportions of about 1 mol of copper chloride to 4 mols of phthalonitrile and from .015 to 0.15 mol of pyridine per mol of phthalonitrile, heating the commingled materials until a blue phthalocyanine is obtained, recovering said phthalocyanine and reducing it to pigment particle size by mechanical means, and recovering a flocculation-resistant, crystal-stable, chlorine-containing phthalocyanine pigment exhibiting the tinctorial characteristics of the alpha crystal phase.

8. The process of claim 7 in which the copper chloride and pyridine are premixed before being commingled with the phthalonitrile.

9. A process for the production of flocculation-resistant, crystal-stable, chlorine-containing copper phthalocyanine pigment which comprises reeacting by commingling copper chloride and pyridine, then commingling the reaction product thus obtained with phthalonitrile, the commingling proportions being about 1 mol of copper chloride to 4 mols of phthalonitrile and about .015 to 0.15 mol of pyridine per mol of phthalonitrile, heating the commingled reaction product and the phthalonitrile until a blue phthalocyanine pigmentary material is obtained, ball milling said pigmentary material in the complete absence of liquid, subsequently ball milling in the presence of acetone and recovering a flocculation-resistant, crystal-stable, chlorine-containing phthalocyanine pigment exhibiting the tinctorial characteristics of the alpha crystal phase.

References Cited in the file of this patent

UNITED STATES PATENTS

| | | |
|---|---|---|
| 2,129,013 | Linstead | Sept. 6, 1938 |
| 2,302,612 | Lacey | Nov. 17, 1942 |
| 2,318,787 | Lacey | May 11, 1943 |
| 2,615,027 | Bluemmel et al. | Oct. 21, 1952 |
| 2,826,589 | Muehlbauer et al. | Mar. 11, 1958 |

FOREIGN PATENTS

| | | |
|---|---|---|
| 741,251 | Germany | Nov. 8, 1943 |
| 410,814 | Great Britain | May 16, 1934 |
| 761,718 | Great Britain | Nov. 21, 1956 |

OTHER REFERENCES

F.I.A.T. Final Report No. 1313, vol. III, p. 346 (1948).